(12) United States Patent
Farnsworth et al.

(10) Patent No.: US 6,664,538 B1
(45) Date of Patent: Dec. 16, 2003

(54) MISMATCHING OF GRATINGS TO ACHIEVE PHASE SHIFT IN AN OPTICAL POSITION DETECTOR

(75) Inventors: Stephen Farnsworth, Loveland, CO (US); Kirk Cook, Lyons, CO (US)

(73) Assignee: Infineon Technologies North America Corp, San Jose, CA (US)

( * ) Notice: Subject to any disclaimer, the term of this patent is extended or adjusted under 35 U.S.C. 154(b) by 0 days.

(21) Appl. No.: 09/569,971

(22) Filed: May 11, 2000

(51) Int. Cl.$^7$ .............................................. G01B 11/14
(52) U.S. Cl. ............................ 250/237 G; 250/231.14
(58) Field of Search ...................... 250/237 R, 237 G, 250/570, 573, 574, 575, 231.14, 231.16

(56) References Cited

U.S. PATENT DOCUMENTS

| | | | |
|---|---|---|---|
| 4,079,252 A | | 3/1978 | Brake |
| 4,956,553 A | | 9/1990 | Matsui |
| 5,104,225 A | | 4/1992 | Masreliez |
| 5,391,865 A | | 2/1995 | Kurata et al. |
| 5,559,599 A | * | 9/1996 | Michel ........................ 356/356 |
| 5,604,345 A | * | 2/1997 | Matsuura ..................... 250/237 |
| 5,710,672 A | | 1/1998 | Roberts et al. |
| 5,710,753 A | | 1/1998 | Brazas, Jr. |
| 5,774,219 A | | 6/1998 | Matsuura |
| 5,812,320 A | * | 9/1998 | Maeda ......................... 359/569 |
| 5,841,134 A | | 11/1998 | Burgschat et al. |
| 5,856,961 A | | 1/1999 | Brazas et al. |
| 5,977,539 A | * | 11/1999 | Holzapfel et al. ....... 250/237 G |

FOREIGN PATENT DOCUMENTS

| | | |
|---|---|---|
| DE | 195 24 725 C1 | 7/1996 |
| EP | 0 741 282 A2 | 11/1996 |

* cited by examiner

Primary Examiner—Edward J. Glick
Assistant Examiner—Hoon Song
(74) Attorney, Agent, or Firm—Fish & Richardson P.C.

(57) ABSTRACT

An optical position detector system has a light emitting diode source, two detectors, and a diffraction grating which is frequency mismatched with the frequency of a reference grating. According to one embodiment for use in a reflective system, the source and two detectors are mounted on a single body and a single diffraction grating is placed over the source and detectors. There is no need to control the locations or phase differences between the source grating and the detector gratings because a single grating us used for all three. The spatial frequency of the single grating is chosen such that it is different from the frequency of the reference grating but still produces a signal having a maximized amplitude with the desired phase shift. Two alignments which formerly required tight tolerance are no longer necessary with the system of the invention. In addition, a fabrication feature of introducing a discrete phase step between the gratings covering both detectors is not necessary. In a second embodiment, for a transmissive system, a source with a source grating is mounted on one body and the two detectors are mounted on another body with the reference grating located therebetween. A single grating is applied over the two detectors and only the detector grating is mismatched with the reference grating.

31 Claims, 3 Drawing Sheets

MISMATCHING OF GRATINGS TO ACHIEVE PHASE SHIFT IN AN OPTICAL POSITION DETECTOR

BACKGROUND OF THE INVENTION

1. Field of the Invention

The invention broadly relates to optical servo systems. More particularly, the invention relates to the optical position detectors using a diffraction grating to sense displacement, and more specifically using a detector grating which is frequency offset from the fundamental frequency of the reference grating.

2. Brief Description of the Prior Art

Systems are known in the art for sensing the position of an object to an accuracy below the micrometer range. These systems utilize a laser diode or LED to produce light which is diffracted from or through a reflective or transparent diffraction grating, often referred to as the reference grating. The diffracted light is detected by two or more detectors which are located out of phase with each other. See, e.g., U.S. Pat. No. 5,104,225 and U.S. Pat. No. 4,956,553. Generally, the light source and the detectors are located on one body, the reference grating is located on another body, and the system is used to detect the relative position of one body to the other. Optical position sensors have many applications wherever it is necessary or desirable to know the relative location of two members within close tolerance. Some applications include robotics, computer operated machine tools, and optical/magnetic data storage.

According to one type of optical position detector (disclosed in U.S. Pat. No. 5,104,225), light impinging on the encoder grating is diffracted and reflected into two diffraction beams. Each diffracted beam is reflected back to the grating, diffracted a second time, and combined into a single beam. The beams are polarized at right angles to each other before the second diffraction to prevent them from interfering in the combined beam. The combined beam then passes through a polarizer which selects components of each beam for comparison with each other. The phase difference between the two beams is based on the position of the encoder grating, so that as the encoder grating moves, the phase relationship of the two beams changes, causing them to constructively or destructively interfere. For first order diffractions, the peak-to-peak period of the interfering beams is p/4, where p is the pitch of the diffraction grating. Thus, for diffraction gratings having a pitch of 1 micron, a peak in the interfering beams occurs each time the scale moves ¼ of a micron, or 250 nm.

Another type of optical position detector is shown in prior art FIGS. 1 and 2, which illustrate reflective and transmissive systems respectively. As shown in FIG. 1, a light source such as a light emitting diode 10 and two detectors 12, 14 are located on a first body 16 which is adjacent to a second body 18. The second body 18 has a reflective backing 20 and a reference grating 22. The light source 10 is provided with a source diffraction grating 24 and the detectors 12 and 14 are provided with diffraction gratings 26 and 28. The broad emission profile of the source provides illumination on paths to each detector 12 and 14. The source grating 24 modulates the light source which impinges on the reference grating 22 and is reflected by the reflective backing 20. The reflected beams pass through the detector gratings 26 and 28 and are detected by the detectors 12 and 14.

Prior art FIG. 2 illustrates a similar system with similar reference numerals referring to similar elements. The chief difference between the systems of FIGS. 1 and 2 is that one is reflective and the other is transmissive. In the transmissive system of FIG. 2, the source 10' is located on the first body 16' and the detectors 12', 14' are located on a third body 16" which is located on the opposite side of the second body 18'. Light from the source passes through the reference grating 22' on the second body 18'.

In order to provide the optimal phase difference between the signals generated by the detectors 12 (12') and 14 (14'), the spatial frequency of the gratings and their relative locations must be tightly controlled. In particular, the spatial frequency of the source grating 24 (24') must be closely "matched" to the reference grating 22 (22'). As used herein the term "matched" is defined to mean that the source grating must have a spatial frequency of a value that yields the peak signal amplitude over each detector. This value occurs when the reference grating is fabricated such that the signal impinging on the face of a given detector is at a constant phase at every point on that detector.

The location of the detectors 12 (12') and 14 (14') must be tightly controlled; and the phase difference between the detector gratings 26 (26'), 28 (28') must also be tightly controlled. For example, in the case of an LS-120 disk drive, the source grating preferably has a frequency one half that of the reference grating and the detectors and their gratings are arranged to provide a quadrature phase shift.

In the prior art, these tolerances were incorporated into the design and fabrication of the positioning system. The spatial offset of detectors (or their apertures) relative to other detectors (or their apertures) was carefully controlled so that each detector looked at a different location on the reference grating. Further, one detector gating was shifted relative to the other detector grating so that there was a discrete phase step in the grating pattern.

It will be appreciated that due to the tolerances required, a reflective system of the type shown in prior art FIG. 1 is often preferred because it allows the source, detectors, and gratings to be located all on the same body making it easier to control their relative positions. Nevertheless, the tight tolerances required for accurate position sensors complicate design and fabrication. The phase difference of the signals at the detectors is affected by all of the factors including the frequency of the gratings and the precision with which the discrete phase step was formed. The presently utilized techniques also require that the reference grating frequency be relatively small which limits the resolution of the position detector.

SUMMARY OF THE INVENTION

It is therefore an object of the invention to provide an optical position detector.

It is also an object of the invention to provide an optical position detector that does not require tight tolerance alignment of all of the elements.

It is another object of the invention to provide an optical position detector design that reduces the overall cost of the device.

It is still another object of the invention to provide an optical position detector that has a higher resolution than the prior art systems.

It is also an object of the invention to provide an optical position detector having fewer components than a prior art detector.

It is another object of the invention to provide an optical position detector in which all of the gratings are formed on a single surface.

It is still another object of the invention to provide an optical position detector design which achieves superior results in bot reflective and transmissive systems.

In accord with these objects, which will be discussed in detail below, the present invention provides an optical position detector system having an LED source, two detectors or more, and a diffraction grating which is frequency mismatched with the frequency of a reference grating with which the detector system will be used. According to a first embodiment for use in a reflective system, the LED source and two detectors are mounted on a single body and a single diffraction grating is placed over the source and detectors. The relative location of the source and the detectors is tightly controlled, but there is no need to tightly control the locations or phase differences between the source grating and the detector gratings because a single grating us used for all three. The spatial frequency of the single grating is chosen such that it is mismatched with respect to the frequency of the reference grating but still produces signals at the detectors with "maximized amplitudes", i.e., amplitudes that are approximately the same as would be observed if the frequencies were exactly matched, but with the desired phase shift.

It has been discovered that a slight spatial frequency mismatch will, with the right reference grating, still result in acceptable amplitude levels at the detectors even though the detectors are not tuned exactly to the fundamental spatial frequency of the reference grating. Since the filtered frequency deviates from the fundamental frequency, a linear phase shift is provided. Thus, the desired phase shift between the detectors is incorporated into the single parameter of the spatial frequency of a single grating which is based solely on the spatial frequency of the reference grating. Two alignments (phase differences between detector gratings and source gratings) which formerly required tight tolerance are no longer necessary with the system of the invention. Fabrication tolerances required to produce the discrete phase step in the detector gratings are also removed.

According to a second embodiment of the invention, for use with a transmissive system, a source with a source grating is mounted on one body and the two detectors are mounted on another body with the reference grating located therebetween. A single grating is applied over the two detectors. According to this embodiment, only the detector grating frequency is mismatched with the reference grating frequency to provide the quadrature signal needed.

Additional objects and advantages of the invention will become apparent to those skilled in the art upon reference to the detailed description taken in conjunction with the provided figures.

DETAILED DESCRIPTION

Figure 1:
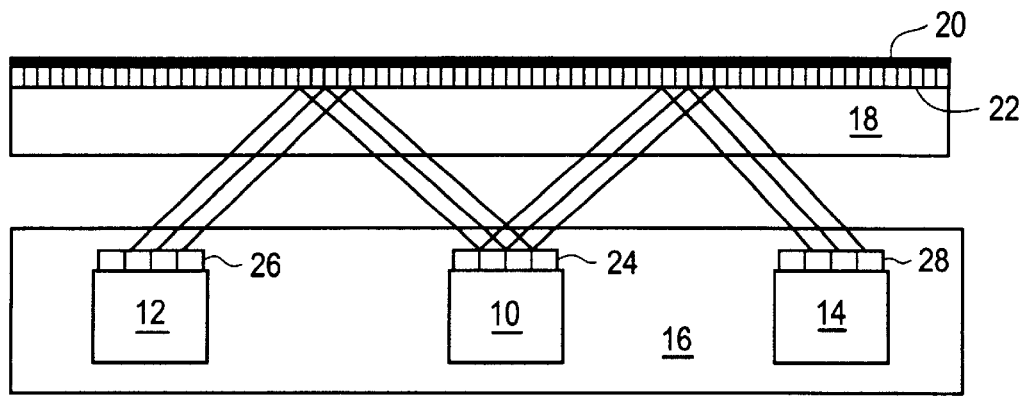
FIG. 1 is a simplified schematic diagram of a prior reflective-type optical position detector.
Figure 2:
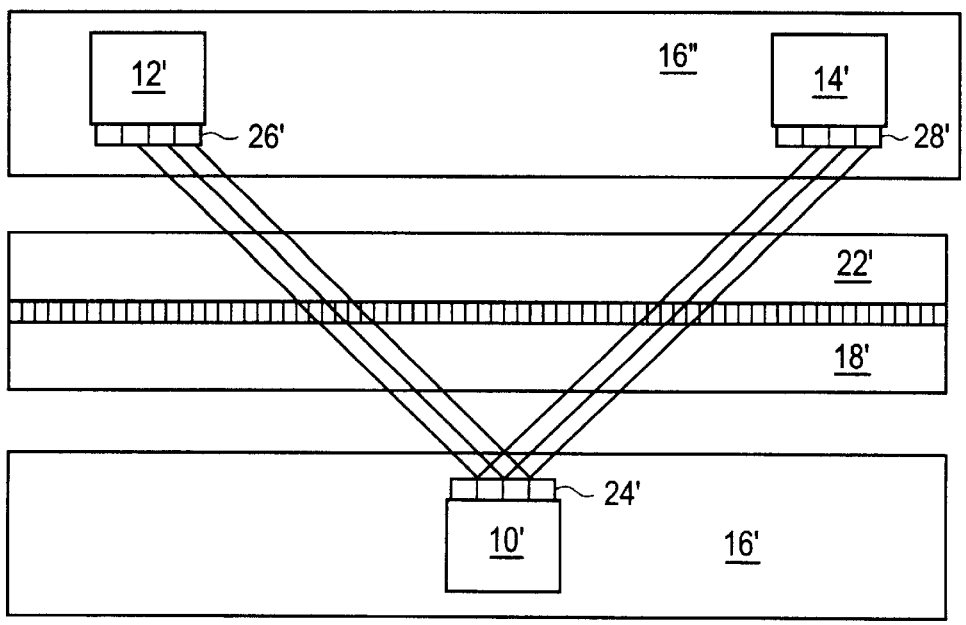
FIG. 2 is a simplified schematic diagram of a prior art transmissive-type optical position detector.
Figure 3:
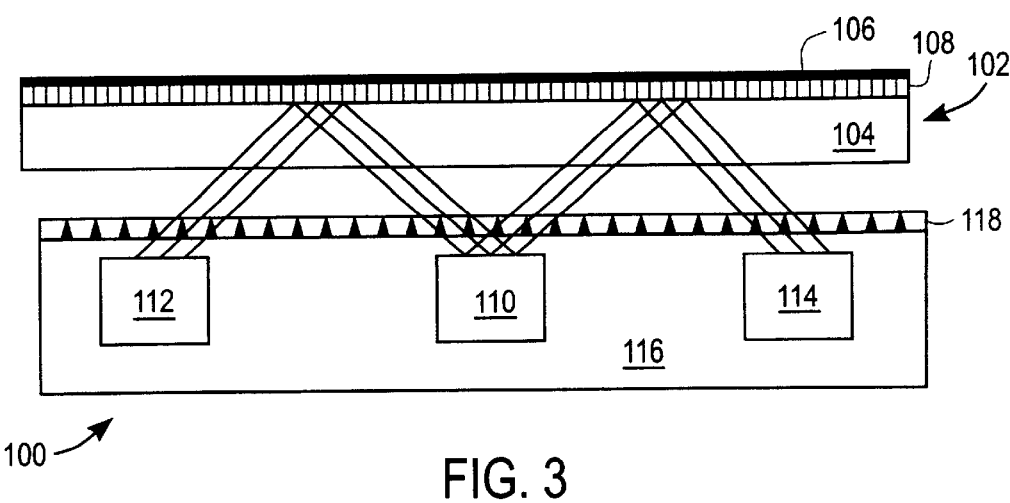
FIG. 3 is a simplified schematic diagram illustrating a first embodiment of the invention.

Turning now to FIG. 3, a first embodiment of the position detector 100 according to the invention is designed for use with a reflective encoder medium 102 having a transparent substrate 104 with a reflective backing 106 and a reference grating 108 therebetween.

The detector 100 generally includes a light emitting diode source 110 and two detectors 112, 114, all mounted on a single body 116. According to the invention, a single diffraction grating 118 is placed over the source 110 and the detectors 112, 114. The relative location of the source 110 and the detectors 112, 114 is tightly controlled, but there is no need to tightly control the locations or phase differences between each of the detector gratings because a single grating 118 is used for all three.

According to the invention, the spatial frequency of the single grating 118 is chosen such that it is mismatched with respect to the frequency of the reference grating 108 but still produces a maximized amplitude at the detectors 112, 114 with the desired phase shift. It has been discovered that a slight spatial frequency mismatch will, with the right reference grating, still result in acceptable amplitude levels at the detectors 112, 114 even though the detectors are not tuned exactly to the fundamental spatial frequency of the reference grating 108. Since the filtered frequency deviates from the fundamental frequency, a linear phase shift is automatically provided. Thus, the desired phase shift between the detectors 112, 114 is incorporated into the single parameter of the spatial frequency of a single detector grating 118 which is based solely on the spatial frequency of the reference grating 108. The alignment (phase differences between detector gratings) which formerly required tight tolerances, is no longer necessary with the system of the invention.

Figure 4:
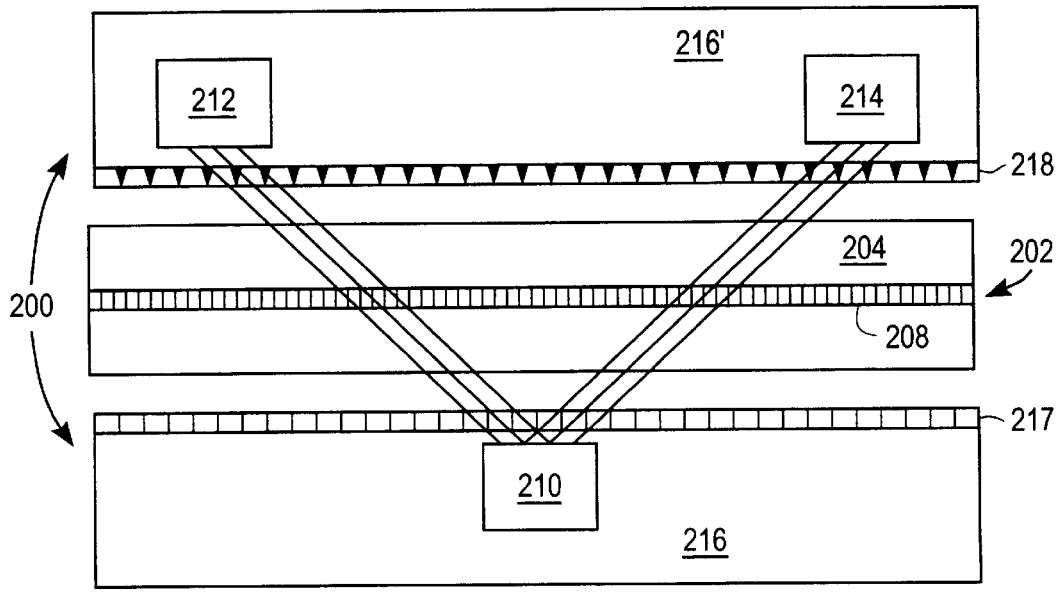
FIG. 4 is a simplified schematic diagram illustrating a second embodiment of the invention.

FIG. 4 illustrates a second embodiment of the invention, with similar reference numerals (increased by 100) referring to similar elements. The optical position detector 200 is designed for use with a transmissive encoder medium 202 having a transparent substrate 204 with a reference grating 208 therein or thereon.

The detector 200 includes a light emitting diode source 210 with a source grating 217 mounted on one body 216 and two detectors 212, 214 mounted on another body 216' with the reference grating 208 located therebetween. A single grating 218 is applied over the two detectors 212, 214. According to this embodiment, only the detector grating 218 is mismatched with the reference grating 208.

The second embodiment provides the same benefits as the first embodiment.

Figure 5:
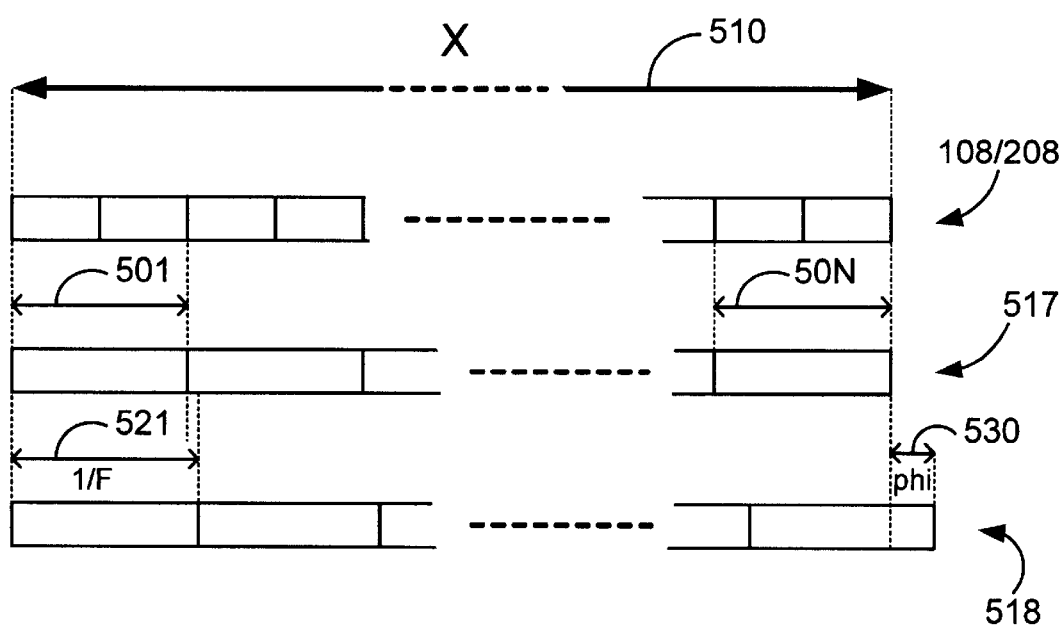
FIG. 5 is a simplified schematic diagram illustrating the mismatched frequencies of the reference and filter gratings.

FIG. 5 illustrates a presently preferred embodiment, the frequency of the source/detector grating 518 is chosen according to the formula shown below as Equation (1), where N is the number of periods 501–50N in the matched filter grating 517 between the detectors, X 510 is the spacing between the detectors, and phi 530 is the desired phase shift.

$$F = (N - \text{phi}/360)/X \tag{1}$$

Using this formula, in the case of a LS-120 disk drive, the frequency of the source/detector grating according to the invention is 12.179144 1/mm as compared to the standard matched frequency of 12.254902 1/mm. This is based on a detector spacing X of 3.3 mm and a phase shift of 90 degrees. Those skilled in the art will appreciate that a period (501, 521)=1/frequency. Thus, the period 501 of the standard matched frequency of 12.254902 1/mm is 1/12.254902= 0.0816 mm. The frequency according to the invention is easily calculated as N=3.3/0.0816 mm=40.441176471; (N-phi/360)=40.441176471−0.25=40.191176471; divided by X=40.191176471/3.3=12.179144 1/mm.

There have been described and illustrated herein embodiments of an optical position detector. While particular embodiments of the invention have been described, it is not intended that the invention be limited thereto, as it is intended that the invention be as broad in scope as the art will allow and that the specification be read likewise. Thus, while a particular number of detectors have been disclosed, it will be appreciated that other numbers (at least two) could be utilized. Also, it will be recognized although the invention has been described without reference to any particular positioning devices, it finds application in all types of optical positioning systems including those used in robotics, machine tools, and optical/magnetic data storage. It will therefore be appreciated by those skilled in the art that yet other modifications could be made to the provided invention without deviating from its spirit and scope as so claimed.

What is claimed is:

1. An optical position detector (100, 200) for installation in an optical servo system including a reference grating (108, 208) having a first fundamental spatial frequency, comprising:
    (a) a light source (110, 210) to provide light beams;
    (b) a plurality of detectors (112, 114, 212, 214) configured to detect non-interfering light beams from the light source; and
    (c) a coherent diffraction grating (118, 218) to diffract the light beams before reaching the detectors, the coherent diffraction grating having a second fundamental spatial frequency which is mismatched with the first fundamental spatial frequency of the reference grating (108, 208).

2. An optical position detector (100) as set forth in claim 1 wherein said light source (110) and said plurality of detectors (112, 114) are mounted on a single first body (116) and a coherent diffraction grating (118) is located over said light source (110) and said plurality of detectors (112, 114).

3. An optical position detector (200, 202) as set forth in claim 1 further comprising a source grating (217), wherein said light source (210) and said source grating (217) are mounted on a first single body (216), and said plurality of detectors (212, 214) are mounted on a second body (216'), said first body (216) and said second body (216') being spaced apart from each other to accommodate locating the reference grating therebetween.

4. An optical position detector (100, 200) for installation in an optical servo system including a reference grating (108, 208) having a first fundamental spatial frequency, comprising:
    (a) a light source (110, 210) to provide light beams;
    (b) a first light detector (112, 212) spaced apart from said light source (110, 210) to detect non-interfering light beams from the light source;
    (c) a second light detector (114, 214) spaced apart from said light source (110, 210) and spaced apart from said first light detector (114, 214) to detect non-interfering light beams from the light source; and
    (d) a coherent detector grating (118, 218) to diffract the light beams, and overlying said first light detector (112, 212) and said second light detector (114, 214), wherein said coherent detector grating (118, 218) has a second fundamental spatial frequency which does not match the first fundamental spatial frequency of the reference grating.

5. An optical position detector (100, 200) according to claim 4 wherein said detector grating (118, 218) has a second fundamental spatial frequency which provides signals at said light detectors having maximized amplitude and phase shifted from each other.

6. An optical position detector (100) according to claim 5 wherein said detector grating (118) overlies said light source (110) as well as said detectors (112, 114).

7. An optical position detector (100) according to claim 6 wherein said light source (110) is a light emitting diode (110).

8. An optical position detector (100) according to claim 7 wherein said light emitting diode (110) and said detectors (112, 114) are carried on the same body (116).

9. An optical position detector (200) according to claim 5 further comprising a source grating (217) overlying said light source (210).

10. An optical position detector (200) according to claim 9 wherein said source grating (217) has a fundamental spatial frequency substantially the same as the first fundamental spatial frequency of the reference grating (208).

11. An optical position detector (200) according to claim 10 wherein said light source (210) is a light emitting diode (210).

12. An optical position detector (200) according to claim 11 wherein said light emitting diode (210) is carried on a first body (216), said detectors (212, 214) and said detector grating (218) are carried on a second body (216'), and said first body (216) and said second body (216') are arranged such that the reference gating (208) passes between them.

13. An optical position detector system (100–102, 200–202), comprising:
    (a) a reference grating (108, 208) having a first fundamental spatial frequency;
    (b) a light source (110, 210) positioned to shed light on said reference grating;
    (c) a first light detector (112, 212) spaced apart from said light source (110, 210) and positioned to detect non-interfering light beams diffracted by said reference grating (108, 208);
    (d) a second light detector (114, 214) spaced apart from said light source (110, 210), spaced apart from said first light detector (114, 214) and positioned to detect non-interfering light beams diffracted by said reference grating (108, 208); and
    (e) a coherent detector grating (118, 218) overlying said first light detector (112, 212) and said second light detector (114, 214), wherein said detector grating (118, 218) has a second fundamental spatial frequency which does not match the first fundamental spatial frequency of said reference grating (108, 208).

14. An optical position detector system (100–102, 200–202) according to claim 13 wherein said coherent detector grating (118, 218) has a second fundamental spatial frequency which provides signals at said light detectors having maximized amplitude and phase shifted from each other.

15. An optical position detector system (100–102), according to claim 14, further comprising a reflective backing (106) located on one side of said reference grating (108), wherein said coherent detector grating (118) overlies said light source (110) as well as said detectors (112, 114), and said light source (110), said detectors (112, 114), and said coherent detector grating are located on the other side of said reference grating (108).

16. An optical position system (100–102), according to claim 15 wherein said light source (110) is a light emitting diode (110).

17. An optical position detector system (100–102), according to claim 16 wherein said light emitting diode (110) and said detectors (112, 114) are carried on the same body (116).

18. An optical position detector system (200–202), according to claim 14 further comprising a source grating (217) overlying said light source (210).

19. An optical position detector system (200–202), according to claim 18 wherein said source grating (217) has a fundamental spatial frequency substantially the same as the first fundamental spatial frequency of the reference grating (208).

20. An optical position detector system (200–202), according to claim 19 wherein said light source (210) is a light emitting diode (210).

21. An optical position detector system (200–202), according to claim 20 wherein said light emitting diode (210) is carried on a first body (216), said detectors (212, 214) and said coherent detector grating (218) are carried on a second body (216'), and said first body (216) and said second body (216') are arranged such that the reference gating (208) passes between them.

22. A method of fabricating an optical position detector system (100, 102), comprising the steps of:
   (a) placing a light source (110), a plurality of detectors (112, 114) and a coherent diffraction grating (118) having a first fundamental spatial frequency and comprising a source filter and a detector filter on the same surface, on a first body (116);
   (b) placing a reference grating (108) on a reflective second body (104), the reference grating having a second fundamental spatial frequency that is mismatched with the first fundamental spatial frequency; and
   (c) spatially offsetting one (112) of the plurality of detectors on the first body (116) relative to at least one other (114) of the plurality of detectors so that at least two of the plurality of detectors are configured to detect non-interfering light beams provided by the light source and reflected at different locations on the reference grating (108).

23. A method of fabricating a transmissive optical position detector system (200, 202), comprising the steps of:
   (a) placing a light source (210) and a source grating (217) on a first body (216);
   (b) placing a plurality of detectors (212, 214) and a coherent detector filter (218) having a first fundamental spatial frequency on a second body (216');
   (c) placing a reference grating (208) having a second fundamental spatial frequency on a third, transmissive body (204), wherein the first and second fundamental spatial frequencies are mismatched; and
   (d) spatially offsetting one (212) of the plurality of detectors relative to at least one other (214) of said plurality of detectors so that at least two of the plurality of detectors are configured to detect non-interfering light beams provided by the light source and reflected at different locations on the reference grating (208).

24. A method of fabricating a reflective optical position detector system (100, 102) including a coherent diffraction grating (118) and a reference grating (108) having a first fundamental spatial frequency, comprising the steps of:
   (a) fabricating the coherent diffraction grating (118) so as to filter spatial frequencies of the reference grating (108); and
   (b) selecting a second fundamental spatial frequency for the coherent diffraction grating (118), the second fundamental spatial frequency being mismatched with the first fundamental spatial frequency for providing signals having maximized amplitude and a preselected phase shift for a pair of detectors; wherein selecting a second fundamental spatial frequency includes employing a fundamental spatial frequency mismatch calculated according to the formula:

$F = (N - phi/360)/X$, where N is the number of matched filter grating periods between the detectors (112, 114), X is the spacing between the detectors (112, 114), and phi is the preselected phase shift.

25. A method of fabricating a reflective optical position detector system (100, 102), comprising the steps of:
   (a) placing a light source (110), a plurality of detectors (112, 114) and a coherent diffraction grating (118) on a first body, the plurality of detectors being configured to detect non-interfering light beams from the light source, the coherent diffraction grating having a first fundamental spatial frequency and comprising a source filter and a detector filter on the same surface;
   (b) placing a reference grating (108) having a second fundamental spatial frequency on a reflective second body (104, 106); and
   (c) purposely mismatching the first fundamental spatial frequency to the second fundamental spatial frequency.

26. A method of fabricating a transmissive optical position detector system (200, 202), comprising the steps of:
   (a) placing a light source (210) and a source grating (217) on a first body (216);
   (b) placing a plurality of detectors (212, 214) and a coherent detector filter (218) on a second body, the plurality of detectors being configured to detect non-interfering light beams from the light source, the coherent detector filter having a first fundamental spatial frequency;
   (c) placing a reference grating (208) having a second fundamental spatial frequency on a third, transmissive body (204); and
   (d) purposely mismatching the first fundamental spatial frequency to the second fundamental spatial frequency.

27. A method of fabricating an optical position detector (100) for installation in an optical servo system including a reference grating (108) having a first fundamental spatial frequency, the optical position detector including a plurality of detectors (112, 114), a light source (110), and a coherent diffraction grating (118) having a second fundamental spatial frequency that is mismatched with the first fundamental spatial frequency, the method comprising the steps of:
   (a) placing the light source (110), the plurality of detectors (112, 114) and the coherent diffraction grating (118), encompassing a source filter and a detector filter on the same surface, on a first body (116); and
   (b) spatially offsetting one (112) of the plurality of detectors on the first body (116) relative to at least one other (114) of the plurality of detectors so that at least two of the plurality of detectors are configured to detect non-interfering light beams from the light source.

28. An optical position detector comprising:
   a light source;
   a first and a second light detector spaced apart from each other to detect non-interfering light beams from the light source; and
   a coherent diffraction grating having a first fundamental spatial frequency and overlying the first and the second light detector, wherein the optical position detector is configured to be positioned in a servo system including a reference grating having a second fundamental spatial frequency that has a mismatch with the first fundamental spatial frequency, and wherein the mismatch provides a phase shift between the first light detector and the second light detector.

29. The optical position detector of claim 1, wherein the coherent diffraction grating is a unitary structure.

30. The optical position detector of claim 1, wherein the coherent diffraction grating is continuous.

31. The optical position detector of claim 1, wherein the coherent diffraction grating has a plurality of portions sharing coherently the second fundamental spatial frequency.

* * * * *

UNITED STATES PATENT AND TRADEMARK OFFICE
CERTIFICATE OF CORRECTION

PATENT NO. : 6,664,538 B1
DATED : December 16, 2003
INVENTOR(S) : Stephen Farnsworth and Kirk Cook It is certified that error appears in the above-identified patent and that said Letters Patent is hereby corrected as shown below:

Title page,
Item [57], Abstract,
Line 9, replace: "detector gratings because a single grating us used for all" with -- detector gratings because a single grating is used for all --

Column 7,
Line 17, replace: "gating (208) passes between them." with -- grating (208) passes between them. --

Signed and Sealed this

Sixth Day of July, 2004

JON W. DUDAS
*Acting Director of the United States Patent and Trademark Office*